(12) United States Patent
Tsai

(10) Patent No.: US 9,082,314 B2
(45) Date of Patent: Jul. 14, 2015

(54) TIME TEACHING WATCH AND METHOD

(71) Applicant: Titanium Marketing, Inc., New York, NY (US)

(72) Inventor: Tak Mou T. Tsai, New York, NY (US)

(73) Assignee: Titanium Marketing, Inc., New York, NY (US)

( * ) Notice: Subject to any disclaimer, the term of this patent is extended or adjusted under 35 U.S.C. 154(b) by 0 days.

(21) Appl. No.: 14/067,085

(22) Filed: Oct. 30, 2013

(65) Prior Publication Data

US 2015/0117162 A1   Apr. 30, 2015

(51) Int. Cl.
G04C 17/00 (2006.01)
G09B 19/12 (2006.01)
G04G 9/00 (2006.01)

(52) U.S. Cl.
CPC ............. G09B 19/12 (2013.01); G04G 9/0088 (2013.01); G04C 17/00 (2013.01)

(58) Field of Classification Search
CPC ........... G04C 3/00; G04C 17/02; G04C 17/00
USPC ........................ 368/29, 79, 82–83, 239–241
See application file for complete search history.

(56) References Cited

U.S. PATENT DOCUMENTS

| 2,853,804 | A | 9/1958 | Bengeyfield |
| 2,994,970 | A | 8/1961 | Spooner |
| 3,022,582 | A | 2/1962 | Pitt |
| 3,608,214 | A | 9/1971 | Rancati |
| 4,121,415 | A * | 10/1978 | Crutcher et al. ................ 368/82 |
| 4,219,943 | A | 9/1980 | Grimes |
| 5,646,913 | A | 7/1997 | Quesenberry |
| 6,198,698 | B1 | 3/2001 | Graves |
| 6,556,513 | B2 * | 4/2003 | Wimberly ....................... 368/82 |
| 6,690,623 | B1 * | 2/2004 | Maano ............................ 368/82 |
| 7,136,327 | B2 | 11/2006 | Hopkins |
| 8,456,960 | B1 | 6/2013 | Terzian et al. |
| 2006/0209637 | A1 * | 9/2006 | May et al. ...................... 368/223 |
| 2008/0013407 | A1 * | 1/2008 | Rauchle ........................ 368/108 |
| 2010/0273137 | A1 | 10/2010 | Carter et al. |

* cited by examiner

Primary Examiner — Sean Kayes
(74) Attorney, Agent, or Firm — Marvin Petry; Stites & Harbison PLLC

(57) ABSTRACT

A watch display and a method of displaying time and date on a watch face. The watch face has an outer portion with twelve on/off lights spaced around the outer portion of the watch face showing numbers 1 to 12 to represent either the twelve hours of time or the twelve months of a year. An inner portion of the watch face includes on/off lights for showing two digits which would represent the minutes in the time mode or the day of the month in the date mode. The watch display may also include an animation mode wherein the lights run through a cycle of turning on and then off, sequentially, one at a time at desired times such as when the power is turned on or just before it is turned off. The method of the present invention includes showing time by turning on the lights showing numbers from 1 through the current hour and showing the minutes by the digits in the inner portion and/or showing the date by illuminating one light at the number of the month and showing the day of the month by the digits at the inner portion. The watch display may switch back and forth between the two modes or when either mode is left unattended or a certain period of time, turn off.

13 Claims, 3 Drawing Sheets

TIME TEACHING WATCH AND METHOD

FIELD OF THE INVENTION

The present invention relates to a watch display and to a method of displaying time and/or date information.

BACKGROUND OF THE INVENTION

The present invention relates generally to a watch which has a unique display, and in particular to the use of such display to teach the fundamentals of showing the time and/or the date.

There comes a time in the learning curve of children when they can read numbers on a watch face but do not understand their meaning. For example a child may be able to read the numbers 9:15 on a digital clock face or see the hands on an analogue clock, one pointing to a 9 (technically, slightly after a 9) and the other pointing to a 3, to represent 9:15, but the child may not be able to understand the meaning of what he is seeing in the overall context of understanding time.

Many prior patents are directed to the teaching of time. These generally use various indicia, colors, shapes, removable pieces, and the like on an analogue clock face, but it is believed that these known teaching watches do not convey to children the fundamentals of the meaning of time.

Thus, there exists a need to provide a teaching watch and method of teaching time which conveys to the child the fundamental principles of the time displayed on the watch.

SUMMARY OF THE INVENTION

The present invention provides a teaching watch and method which overcome the shortcomings of the prior art by teaching a child the underlying fundamentals of the time as displayed on a watch. The principles of the present invention are also applied to teaching the fundamentals, understanding and representation of the current date.

In accordance with the present invention, the watch face comprises twelve outer positions in a closed path around an outer portion of the watch face at the locations where the numbers 1 to 12 appear, each position including a light, preferably an LED, which may be turned on or off. When the light at each position is turned on, it will give off a light indicating that position is "on". While the indicia can take various forms, in a preferred arrangement it will show the actual number, so that the invention will be described below with respect to that preferred arrangement. An inner portion of the watch face has inner light positions with lights which indicate digits.

To read time, the user would activate a time mode during which the outer lights would illuminate from 1 to the current hour. The minutes would be shown by the two digits in the inner portion of the watch face. Thus, the user would see the lit outer lights 1-7, and the minutes, for example the digits "1" and "5" displayed in the inner portion for the time of 7:15. Seeing this will give the user a better understanding as to the meaning of 7 in the context of the watch face as a whole, or viewed differently, it depicts more vividly the meaning of the $7^{th}$ hour in the context of all of the times displayed during 12 hours of the cycle of a clock. Once a user such as a child understands the significance of the hour, it is less difficult to convey the meaning of minutes which is in fact a less important parameter to a child learning the fundamentals of telling time. In the present invention, the minutes would simply be displayed in digital form in the inner portion. An indicia would be provided for designating AM or PM, for example a light over one of the minute numerals.

The teaching watch has a second mode to show the date in a way which places the month in context. A child at this point in his or her life would normally have some understanding as to at least the positions of the outer lights at positions 1-12. Thus, in switching to date mode, the watch would only light one outer light, that being at the current month, and the digits in the inner portion would indicate the day of the month.

Preferably, in the time mode and the date mode, the minutes and day of the month, respectively, would include two numerals, i.e., a single digit would be preceded by a 0. In the time mode, a blinking light over the left hand digit would show that it is in time mode while a steady light over the right hand digit would show that the time is either AM or PM (and that steady light would simply not be illuminated for the other).

The present teaching watch would preferably include an animation to attract the user's interest when the watch is turned on. For example when the watch is turned on, the twelve outer lights could be lit up in sequence, one at a time, on and then off, from 1 to 12 and then reversed to turn all of the lights on and off, one at a time, after which the watch would automatically go into time mode. When the watch turns off, the same animation could be repeated just prior to the termination of power.

In a preferred operation, turning the watch on and off and between the different modes would be achieved by pushing a button which could preferably be at the central portion of the watch face, i.e., it would not necessarily visually show a button but just touching the watch face at that location would act as a button.

In operation, with the watch turned off, the watch face is plain and no indicia are visible. Touching the button once would preferably activate the animation mode and then go right into clock mode by lighting the correct numbers at the outer positions and displaying the minutes in the inner portion. A separate light over the right digit designates AM or PM.

In time mode, within a given time, for example five seconds, if the user pushes the button, the watch will switch to the date mode and display the date. If the user does not push the button within the allotted time, the watch will turn off, first going through the animation mode before the power actually turns off.

Similarly, after the watch has displayed the date, if the button is pushed within the first five seconds, the watch will return to time mode and if the watch is not touched for five seconds, the power will turn off as discussed above by displaying the animation mode before the power is actually turned off.

Thus, in use the user can switch back and forth between time mode and date mode as much as desired but if either is left on for more than the allotted time, the watch will turn off.

The present invention also includes a method of teaching the fundamentals of time by providing a watch having a watch face with twelve positions 1 to 12 around the outer portion thereof and in the inner portion, two inner positions for two digits, and then activating a time mode to cause the numbers from 1 to the actual hour to light up, with the digits in the inner portion showing the minutes.

The present invention could also show a date by turning on the light at the outer position showing the number of the month, and the two digits in the inner portion showing the day of the month.

The present invention also includes a method of displaying the time and/or date by the operation of the display, as described above.

Thus, it is an object of the present invention to provide a new watch display and method of display which teaches the fundamentals of telling time by lighting appropriate numbers on the face of the watch.

It is another object of the present invention to provide, in combination with an aid for teaching the fundamentals of telling time, a teaching device and method for displaying the date in a way which is fundamental to the concept of a date.

These and other objects of the present invention will be apparent from the detailed description to follow.

BRIEF DESCRIPTION OF THE DRAWINGS

A preferred embodiment of the present invention will now be described, by way of example, with reference to the accompanying drawings, in which.

DETAILED DESCRIPTION OF THE PREFERRED EMBODIMENTS

Referring to the figures, like elements are represented by like numerals throughout the specification.

Figure 1:
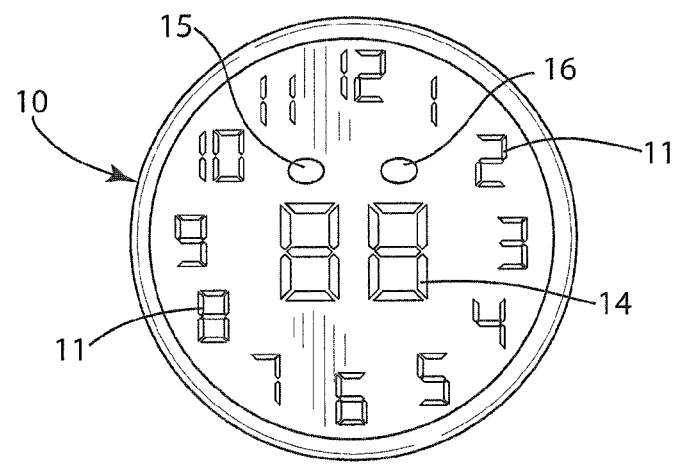
FIG. 1 is a diagrammatic representation of a watch face according to the present invention, showing the location of all potentially lit lights.

FIG. 1 shows, for purposes of illustration, the positions of all lights which are illuminated, when the watch is turned on, at different times during the various modes of operation. These lights will generally be LEDs. It is to be understood that the watch face never appears with all lights on as shown in FIG. 1. The watch face itself is represented by the numeral 10. There are twelve outer light positions 11 arranged in a path, preferably a circle, around the outer portion of the watch face, preferably showing numbers 1 to 12, representing either 12 hours or 12 months, in a time mode or a date mode, respectively. 14 illustrates all of the potential lights to form two digits in the inner portion of the watch face. Light 15 represents the position of a light which is turned on, preferably blinking, during operation in the time mode. 16 represents another light position which is turned on during the time mode to indicate AM or PM.

Figures 2, 3:
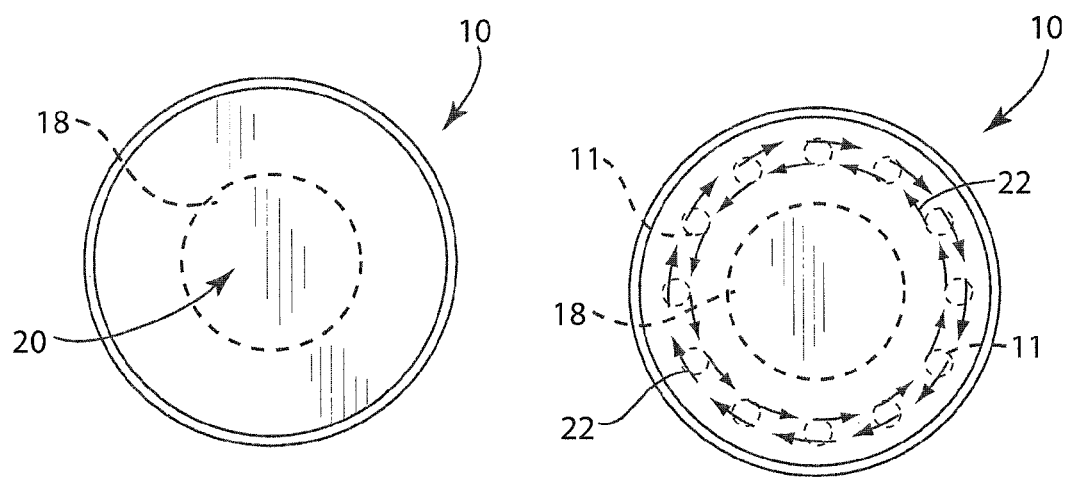
FIG. 2 shows diagrammatically a watch face in accordance with the present invention in the off position.
FIG. 3 shows diagrammatically a watch face in accordance with the present invention in an animation mode.

FIG. 2 illustrates the watch face in the off position. All of the lights are off. The dotted line 18 is provided to generally illustrate the separation between the outer portion located between the dotted circle and the outside boundary of the watch face and an inner portion located within the dotted circle 18. The watch face may be of one solid color across its entire surface wherein the dotted line 18 is only a representation of the two areas and does not physically exist. In other embodiments, the areas on each side of dotted line 18 may for design purposes be of different colors or shades.

The central portion of the watch face acts as a button. The button may not be at all visible but when one pushes down in that area, it changes the mode of operation of the watch, as described below.

Figure 4:
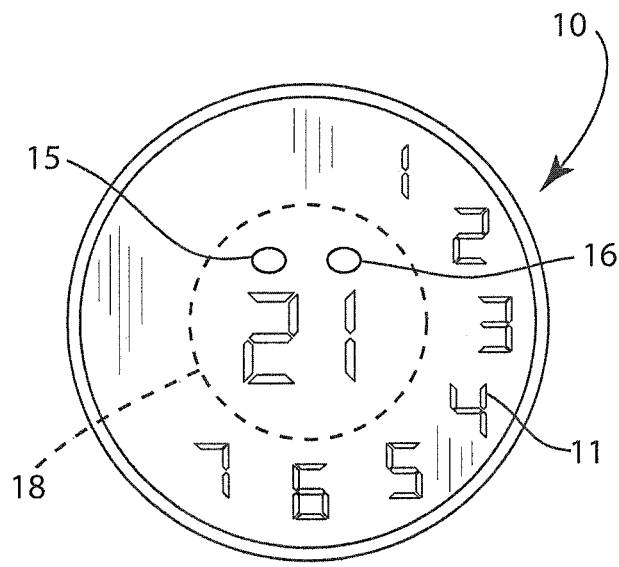
FIG. 4 shows a watch face in accordance with the present invention in a time mode.
Figure 5:
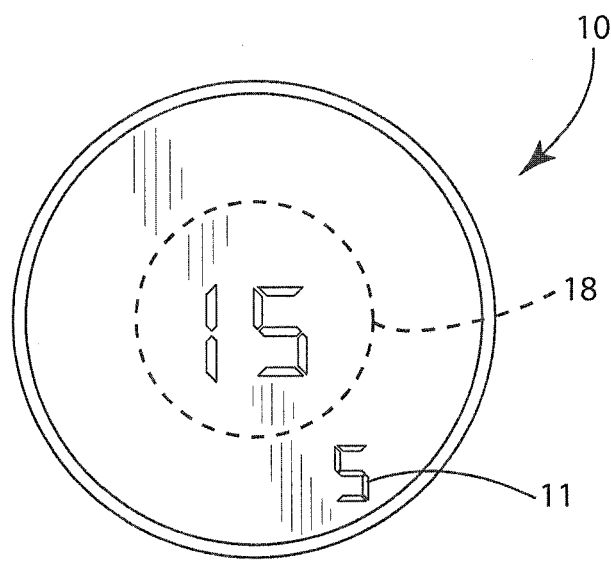
FIG. 5 shows a watch face in accordance with the present invention in a date mode.

FIGS. 3, 4 and 5 illustrate diagrammatically and by way of example, three modes of operation other than the off position shown in FIG. 2.

A first mode, shown in FIG. 3, is an animation mode. When the watch is off and the user pushes button 20 in the outer portion of the watch face, the lights 1 to 12, will light up, in sequence, one at a time, on and off, clockwise, after which the lights are turned on and off, one at a time, in the counterclockwise direction until all of the numbers have been turned on and off. The animation mode does not actually perform a function with respect to conveying time or date information. However, since one function of this watch is to serve as a teaching watch, especially for children, this animation stage serves the purpose of catching a child's attention.

After the animation mode, the watch automatically switches into time mode. To illustrate the time, the lights forming numbers from 1 to the current hour will all light up all at once, and the minutes are displayed in the inner portion. The minutes always include two digits. Above the left hand digit is a blinking light 15 which constantly blinks in time mode. The right hand light 16 shows AM or PM, and remains un-illuminated for the other. Thus, FIG. 4 shows a time of 7:21 PM.

After the time mode, if the button 20 is not pushed within a certain time, e.g., five seconds, the watch will turn off, in order to conserve the battery. Preferably, just before the watch turns off, it goes through the animation mode.

If the user pushes the button 20 within the time limit, the watch goes into date mode, as shown in FIG. 5. In date mode, the watch displays the number of the month at its correct position in the outer portion, with the day of the month shown by the digits in the inner portion. As with time mode, date mode always includes at the inner portion two digits, including a zero preceding a single digit date. Thus, FIG. 5 shows the date of May 15$^{th}$.

If the button is not pushed in the date mode for the time limit, then (as in the time mode) it will turn off, first running through the animation mode before it completely turns off. However, if, prior to the time limit, the operator touches the button 20, the watch will switch back to time mode. The operator may then switch back and forth between time mode and date mode until, in either time or date mode, the operator leaves the watch unattended for the time limit, after which it will turn off.

The present invention also includes a method of displaying time and/or date on a watch face. The method includes employing a display such as a watch face with on/off lights showing the numbers at each of the twelve positions around the outer portion of the watch face representing the twelve hour positions or the twelve months of the year, and including two on/off lights at positions in the inner portion of the watch face to show two digits. In order to display time, which of course is maintained internally, the user pushes a button or the like to convert the display to time mode, at which time lights turn on showing the number 1 to the number representing the hour, and the minutes are shown by the two digits in the inner portion of the display face.

In accordance with the present method, the date mode may be represented by turning on a light showing the number which represents the month, and showing the day within the month with the two digits in the central portion of the watch face. In accordance with another aspect of the present invention, the method may include an animation mode which can be turned on at any time during the operation of the watch face, for example at the beginning when the power is turned on and at the end, just before the power is turned off. Animation mode may comprise lighting up all of the numbers, in sequence one at a time, on and off, starting with the number 1 all the way around to the number 12, and then reversing the cycle from 12 to 1. In accordance with another aspect of the method, the user can switch back and forth between time mode and date mode, but whenever either is left unattended for a certain time limit, the watch will turn off.

Figure 6:
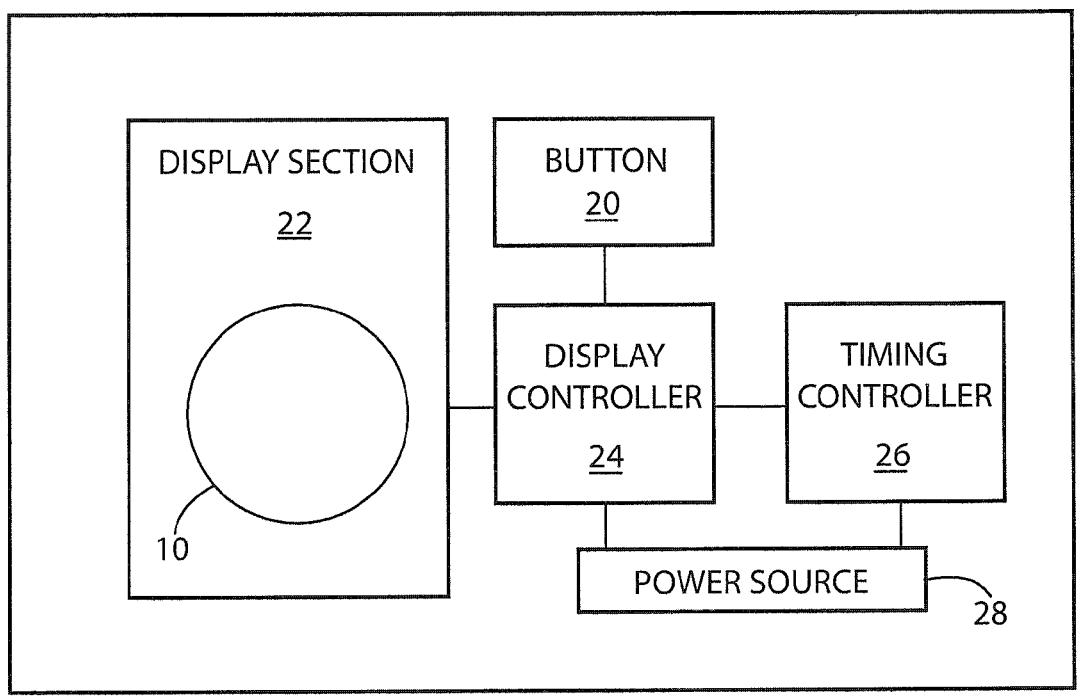
FIG. 6 is a block diagram showing the operation of the present invention.

FIG. 6 is a block diagram illustrating an exemplary embodiment of the components of a watch in accordance with the present invention. As shown in FIG. 6, the watch generally includes a display section 22 that includes the various lights 11, 14, 15, and 16 that illuminate the watch face 10 as described above with reference to FIG. 1, a button 20, a display controller 24, a timing controller 26, and a power source 28 for powering the watch. In particular, as illustrated in FIG. 6, the display section 22, the display controller 24, and the timing controller 26 are powered by the power source 28, which may include one or more power sources (for example, batteries of different sizes and/or voltages).

In exemplary embodiments, the display controller 24 may be any type of logic device known in the art such as an electronic circuit, a micro-controller, a microprocessor, a programmable logic controller (PLC) or the like, that is operable to receive inputs and affect one or more outputs relative to the received inputs. The display controller 24 is operative to control the display section 22 to thereby affect the manner of the display on the watch face 10 according to the various display modes described above with respect to the embodiments discussed above with reference to FIGS. 1-5. The display controller 24 receives communications such as inputs from the timing controller 26 and from button 20 and output control signals to drive the display shown on the watch face 10 relative to the inputs. More specifically, the display controller 24 is operatively coupled to control the watch face 10 for the purposes of respectively illuminating and de-energizing the various lights 11, 14, 15, and 16.

In exemplary embodiments, the timing controller 26 may be configured to generate and output timing signals to the display controller 24 that are used by the display controller to control, as a function of time, both the progression of the display on the watch face 10 according to the various display modes described above and the progression of the actual time and date being displayed on the watch face. The timing controller 26 may be implemented as electronic circuitry. Of course, it should be appreciated that timing controller 26 may alternatively be implemented by way of software, mechanical, or electric arrangements, as an atomic clock, or any suitable combinations thereof.

As discussed above, each of the lights 11, 14, 15, and 16 may comprise one or more lights such as light-emitting diodes (LEDs) in exemplary embodiments. Of course, it should be appreciated that lights 11, 14, 15, and 16 may alternatively comprise an electronic display area implemented as a liquid-crystal display (LCD), organic light-emitting-diodes (OLED), and electronic ink displays, or any other suitable display types or combination of display types. Moreover, if each light section 11, 14, 15, and 16 comprises more than one or a plurality of lights (for example, LEDs) to provide reliability and visibility, the lights of each light section act together in communication with the display controller 24 to turn on and off as a single light.

Although the invention has been described with respect to a preferred embodiment, it is to be understood that the invention is capable of numerous modifications and variations, apparent to those skilled in the art, without departing from the spirit and scope of the invention.

The invention claimed is:

1. A watch display comprising:
   an outer portion having twelve outer light positions, each including an outer light which may be individually turned on or off,
   an inner portion having two inner light positions, each including an inner light which may be individually turned on or off,
   the outer lights being capable of being individually turned on or off to convey certain information,
   the inner lights being capable of being turned on or off, and when on, to form digits which bear a relationship to the information represented by the lit outer lights, and
   wherein the watch display includes an animation mode, separate from both the time mode or the date mode, during which the outer lights turn on and then off, in sequence, one at a time from one number, all of the way around to the number preceding said one number, and then in reverse, all the way back to said one number.

2. A watch display according to claim 1, wherein the lights are light emitting diodes (LEDs).

3. A watch display according to claim 1, wherein the watch display includes a time display mode in which the outer lights represent the twelve hours and the inner lights represent minutes.

4. A watch display according to claim 3, wherein, in the full display in the time mode, the outer lights are lit from the 1 position to the position of the hour of the current time, and the minutes are shown as two digits by the inner lights.

5. A watch display according to claim 4, wherein in the time mode, a light in the inner portion turns on to represent AM or PM, and turns off to represent the other of AM or PM, and wherein another light in the inner portion blinks during the time mode.

6. A watch display according to claim 5, wherein the outer lights display the actual numbers 1 to 12.

7. A watch display according to claim 1, wherein the watch display includes a date mode wherein the outer light positions represent the twelve months of the year and the inner lights in the inner portion represent the day of the month.

8. A watch display according to claim 7, wherein, in the date mode, a single outer light turns on at the outer light position representing the current month.

9. A watch display according to claim 8, wherein the outer lights display the actual numbers 1 to 12.

10. A watch display according to claim 1, wherein the animation mode is displayed just after the watch display is turned on and/or just before the watch display is turned off.

11. A watch display according to claim 1, which includes at least a time mode and a date mode, which are each shown independently of the other, and wherein the watch is capable of switching back and forth between the time mode and the date mode and vice versa.

12. A watch display according to claim 11, wherein, if a watch display is in either the time mode or the date mode, and not attended to within a predetermined time, the watch will turn off.

13. A watch display according to claim 1, wherein the watch display includes at least a time mode and a date mode and including a button activated by touching the watch display which turns the watch display on and switches from one mode to the other and vice versa.

* * * * *